United States Patent [19]

Yamada

[11] Patent Number: 5,729,326
[45] Date of Patent: Mar. 17, 1998

[54] IMAGE PRINTER HAVING IMAGE EXPOSING MEANS

[75] Inventor: Junji Yamada, Wakayama, Japan

[73] Assignee: Noritsu Koki Co., Ltd., Wakayama, Japan

[21] Appl. No.: 391,848

[22] Filed: Feb. 22, 1995

[30] Foreign Application Priority Data

Mar. 2, 1994 [JP] Japan .................. 6-032084

[51] Int. Cl.$^6$ .................. G03B 27/52; G03B 27/80
[52] U.S. Cl. .................. 355/40; 355/41; 355/42
[58] Field of Search .................. 355/39, 40, 41, 355/42

[56] References Cited

U.S. PATENT DOCUMENTS

| | | | |
|---|---|---|---|
| 5,287,141 | 2/1994 | Yoshikawa | 355/40 |
| 5,337,119 | 8/1994 | Tanibata | 355/40 |
| 5,383,035 | 1/1995 | Suzuki | 358/500 |
| 5,428,422 | 6/1995 | Tanibata | 355/40 |

FOREIGN PATENT DOCUMENTS

| | | |
|---|---|---|
| 6547357 | 6/1993 | European Pat. Off. . |
| 615154 | 9/1994 | European Pat. Off. . |
| 351838 | 3/1991 | Japan . |
| 4291249 | 10/1992 | Japan . |
| 9004302 | 4/1990 | WIPO . |
| 9103768 | 3/1991 | WIPO . |

OTHER PUBLICATIONS

Research Disclosure, vol. 327, No. 048, 10 Jul. 1991 "Data Reproduction on Photographic Prints".

*Primary Examiner*—R. L. Moses
*Assistant Examiner*—Shival Virmani
*Attorney, Agent, or Firm*—Felfe & Lynch

[57] ABSTRACT

An image printer has an image exposure unit for exposing a photosensitive material with an image of a film, a recording data input unit for inputting recording data to be exposed on the photosensitive material in accordance with the image, and a recording data exposure unit for exposing the photosensitive material with the recording data inputted from the recording data input unit.

19 Claims, 4 Drawing Sheets

IMAGE PRINTER HAVING IMAGE EXPOSING MEANS

BACKGROUND OF THE INVENTION

1. Field of the Invention

The present invention relates to an image printer, and more particularly to an image printer having image exposing means for exposing a photosensitive material with a film image.

2. Description of the Related Art

An image printer of the above-noted type is for use in producing a photographic print from a film image by exposing a photosensitive material such as a print paper with an image on e.g. a negative film.

That is, as the image printer is used basically for reproducing a film image on a photosensitive material, the printer was generally devoid of the function for exposing the photosensitive material with any other information or data than the film image.

On the other hand, a user often desires to obtain such data as the date of the photography of the finished photographic print, photographic data including the type of film used and so on. Yet, as the user generally finds it troublesome to record such data separately from the photographic print, he/she would wish to be able to obtain the data only by looking at the photographic print per se.

In order to meet such demand, the prior art provides for recording e.g. the date of photography in the photographic print per se. With this, the date of photography is recorded at a portion of an image recording area of the film at the same time as the photographing operation, and then the above-described image printer exposes this film onto a photographic material, so as to produce a photographic print containing the date of photography.

According to the above-described prior art, the photography date datum is directly recorded within the image recording area of the film, so that this film contains this non-image datum in a mixed and non-erasable condition, together with the image of a photographic subject which is the very object of film recording.

Further, such recording of non-image data within the image-recording area of the film necessarily limits the area of the film available for image recording.

The present invention attends to the above-described state of the art. A primary object of the invention is to problems of the convention provide an image printer which allows recording of non-image data such as those relating to photography conditions in a photographic print in such a manner that the non-image data are not present in a mixed state within the image-recording area of the film.

A second object of the present invention is to achieve the above-noted primary object with an image printer which is easy to handle.

A third object of the present invention is to achieve the primary or secondary object while assuring the possibility of obtaining exposure conditions at higher precision for exposing the photosensitive material.

A fourth object of the present invention is to achieve the first, second or third object with an image printer having a simple construction.

SUMMARY OF THE INVENTION

For accomplishing the above-noted object, an image printer, according to the present invention, comprises:

image exposure means for exposing a first area of a photosensitive material with an image of a film;

recording data input means for inputting recording data to be exposed on the photosensitive material in accordance with the image; and recording data exposure means for exposing the photosensitive material with said recording data inputted from said recording data input means.

According to the above-described construction, after the recording data input means inputs a variety of recording data useful for indicating the history of a finished photographic print to be exposed onto the photosensitive, the recording data exposure means exposes the photosensitive material with the inputted recording data in accordance with the film image.

As the photosensitive material is exposed with the film image together with the recording data corresponding thereto, the resulting photographic print is printed with the inputted recording data together with the film image.

The recording data exposure means exposes the photosensitive material with the recording data which has been inputted from the recording data input means, so that the recording data are not present in a mixed state within the image-recording portion of the film.

Hence, the above-described construction achieves the object of the present invention by providing an image printer which allows recording of non-image data such as those relating to photography conditions in a photographic print in such a manner that the non-image data are not present in a mixed state within the image-recording area of the film.

According to one aspect of the present invention, the recording data input means includes reading means for reading recording data which are recorded in a magnetic recording portion of the film.

With this construction, the reading means of the recording data input means reads, from the magnetic recording portion of the film, the recording data to be exposed in correspondence with the film image. Then, the recording data exposure means exposes a second area of the photosensitive material with the read recording data.

A film having the magnetic recording portion at a side margin of each film frame or a leading margin of a row of film frames arranged in series may record, by a camera, such photographic data as the type of the film, a frame number, a date of photography, a shutter speed, an aperture value and so on. Therefore, these kinds of data may be printed in the photographic print as well.

This construction makes it unnecessary for the user to manually input the recording data to the magnetic recording portion. Hence, the construction may render the image printer easier to handle.

According to a further aspect of the present invention, the recording data input means includes manual input means for allowing manual input of the recording data to be exposed on the photosensitive material.

With this construction, after the user manually inputs the recording data to be exposed in correspondence with the film image means provided to the recording data, the recording data exposure means exposes the photosensitive material with the manually inputted recording data.

That is to say, by manually inputting from the manual input means the data useful for indicating the history of the photographic print, the photographic print may be printed with such inputted data.

This construction allows exposure of the photographic material with desired recording data even if the film per se does not contain the recording data or the recording data recorded in the film are not sufficient as the recording data to be exposed on the photosensitive material. Accordingly, the image printer having this construction will prove more convenient.

According to a still further aspect of the present invention, the image printer further comprises mode instructing means for selectively instructing a recording data exposure mode or a recording data non-exposure mode, so that the recording data exposure means effects exposure of the recording data only when the mode instructing means instructs the recording data exposure mode.

With the above construction, the operator instructs either the recording data exposure mode or the recording data non-exposure mode by using the mode instructing means. Then, if the recording data exposure mode has been selectively instructed, the recording data exposure means exposes the photographic material with the recording data inputted from the recording data input means. Conversely, if the recording data non-exposure mode has been instructed, the recording data does not effect the exposure of the recording data onto the photosensitive material.

That is to say, this construction allows the recording data to be recorded in the photographic print only when so desired.

As a result, the image printer having this additional feature may provide a greater variety of applications, hence greater convenience.

According to a still further aspect of the present invention, the image exposure means obtains exposure conditions based on the recording data inputted from the recording data input means.

With the above construction, based on the recording data inputted through the recording data input means, the image exposure means obtains the exposure conditions.

That is, since the recording data inputted through the recording data input means may include those data based on which exposure conditions are to be determined, such as the data concerning the conditions in which the object was photographed; then, the exposure conditions are obtained by using these data corresponding to the image actually recorded on the film.

As a result, it becomes possible to obtain the exposure conditions to be used in the exposure of the photosensitive material with higher precision.

According to a still further aspect of the present invention, the image printer further comprises monitor means for displaying the recording data inputted from the recording data input means and correction input means for correcting the recording data to be exposed by the recording data exposure means.

With the above-described construction, the recording data inputted from the recording data input means are displayed on the monitor means. Then, by observing the data displayed on the monitor means, the operator may correct, by using the correction input means, the recording data to be exposed by the recording data exposure means.

Namely, if erroneous recording data have been inputted from the recording data input means, the operator may correct these erroneous recording data. Hence, the image printer provided with this additional feature will provide even greater convenience.

According to a still further aspect of the present invention, the image printer further comprises image information reading means for reading the image information of the film in the form of a plurality of discrete areas, wherein the image exposure means determines an exposure amount for each of the discrete areas based on the recording data read by the image information reading means and then exposes the photosensitive material with thus determined exposure amounts; and the image exposure means acts also as the recording data exposure means for exposing the photosensitive material with the recording data inputted from the recording data input means.

With the above-described construction, the image exposure means exposes the photosensitive material by exposure amounts determined for each of the discrete film areas based on the image information read by the image information reading means. Further, the image exposure means acts also as the recording data exposure means. Thus, this exposure means may expose both the film image information read by the image information reading means and the recording data inputted from the recording data input means.

Consequently, since the image exposure means may expose both the film image information read by the image information reading means and the recording data inputted from the recording data input means, the image printer may be formed more simply.

Further and other objects, features and effects o the invention will become more apparent from the following more detailed description of the embodiments of the invention with reference to the accompanying drawings.

DETAILED DESCRIPTION OF THE PREFERRED EMBODIMENTS

Figure 1:
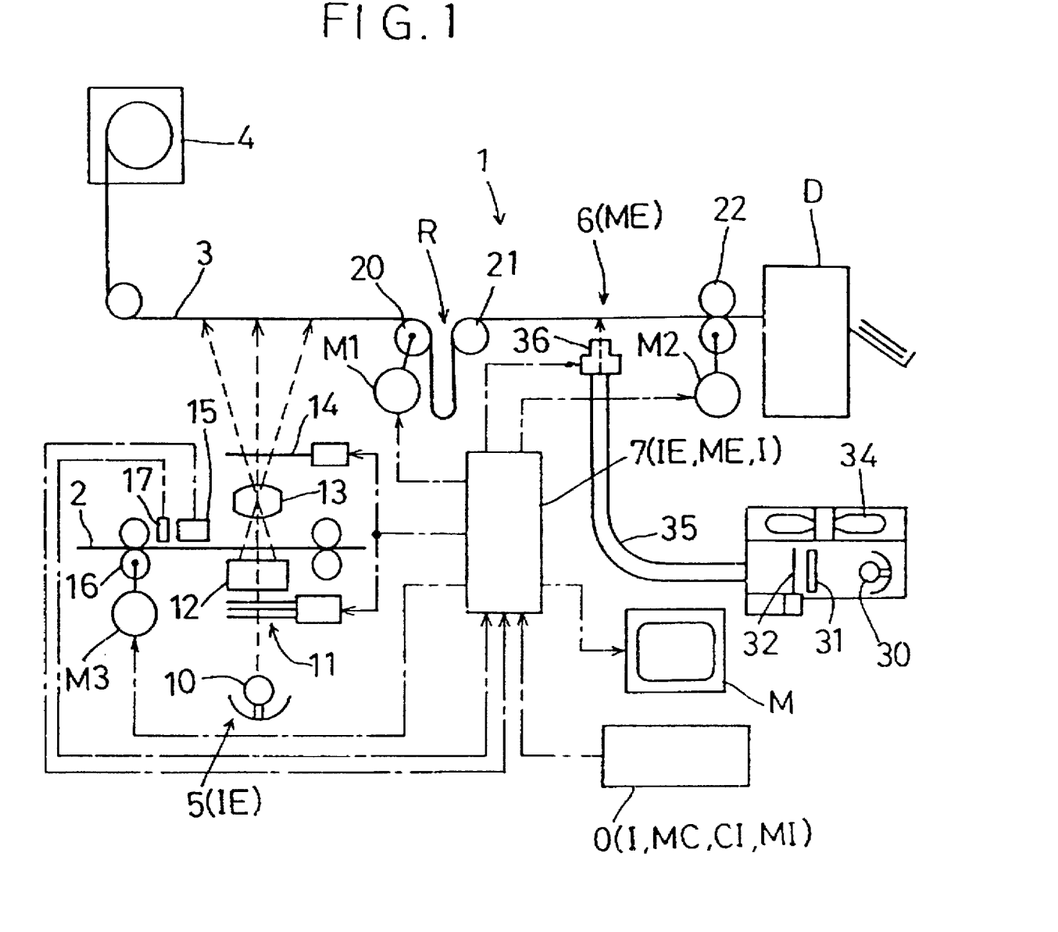
FIG. 1 is a schematic construction view of an image printer according to one preferred embodiment of the invention.

As shown in FIG. 1, an image printer 1 includes a projection exposure unit 5 for projecting and exposing an image of a film 2 onto a print paper 3 as a photosensitive material, a moving exposure unit 6 for exposing various kinds of recording data onto the print paper 3, a loop forming unit R for forming a loop of the print paper 3 so to effect transportation of the print paper 3 at the projection exposure unit 5 and the moving exposure unit 6 independently of each other, a developing unit D for developing the exposed print paper 3, and a controller 7 for controlling the respective components of this image printer 1. The controller 7 is connected to a control panel O for inputting various commands and to a monitor M for displaying image data.

The print paper 3 is adapted to be withdrawn from a print-paper magazine 4 in which the print paper 3 is stored in a rolled state. This print paper 3, after exposure at the projection exposure unit 5 alone or exposures at both the projection exposure unit 5 and the moving exposure unit 6, is developed at the developing unit D and then cut into segments each containing one frame amount of image information to be ejected from the apparatus.

The image printer 1 selectively provides two modes of recording data exposure mode and recording data non-exposure mode. In the recording data exposure mode, the print paper 3 is exposed at both the projection exposure unit 5 and the moving exposure unit 6. In the recording data non-exposure mode, the print paper 3 is exposed at the projection exposure unit 5 alone. Which of these two operation modes is to be executed is selected by a mode command input from the control panel O.

Next, the respective components will be specifically described.

The projection exposure unit 5 includes a projection exposure light source 10, a light modulating filter 11 for adjusting color balance of the light beam to be irradiated on the film 2, a mirror tunnel 12 for uniformly mixing the light beam passing the light modulating filter 11, a printing lens 13 for imaging the image information of the film 2 on the print paper 3 and a shutter 14, with all these components being aligned on a common optical axis.

An image sensor 15 for reading the image information of the film 2 in the form of a great number of discrete areas is disposed upstream of the projection exposure unit 5 relative to the transport direction of the film 2. This image sensor 15 is operable to irradiate a white light beam onto the film 2 and separate its reflection or transmission light beam into three primary color components of red, green and blue and then to measure the intensities of the respective components by means of a CCD line sensor, a CCD image sensor or the like. This image information read by the image sensor 15 is transmitted to the controller 7 to be used for obtaining exposure conditions at the projection exposure units 5. The controller further causes the monitor M to display a simulated image which would result by exposing the the print paper 3 under the obtained exposure conditions.

Figure 2:
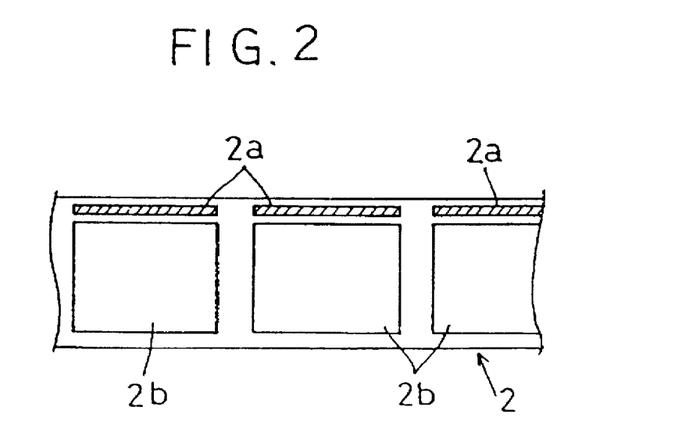
FIG. 2 is a view showing a film portion of the embodiment of FIG. 1.

On the upstream of the image sensor 15 relative to the transport direction of the film 2, there is provided a magnetic head 17 for reading recording data recorded at a magnetic recording portion 2a of the film 2 shown in FIG. 2.

The magnetic recording section 2a of the film 2 is recorded by a camera with various recording data including a type of the camera used, a type of the film used, a frame number, a film sensitivity, a date of photography, a designation of quasi-zooming/panoramic printing, use or non-use of backlight/under or overexposure, use or non-use of flash, a color temperature of the flash used, a shutter speed, an aperture value, a lens-to-object distance, an orientation of the camera used, a location of the photography, an identification of the object such as 'snowy mountain', 'setting sun', 'human subject' and other kinds of photographic data.

The above-described data read by the magnetic head 17 are utilized for calculating the exposure conditions to be used for the exposure at the projection exposure unit 5 of a frame 2b corresponding to the magnetic recording portion 2a read. Also, these data are used as the recording data to be exposed on the print paper 3 in correspondence with the image of the film 2.

As shown in FIG. 2, the magnetic recording portion 2a is provided at a side margin of the frame 2b which is an image-recording portion. Or, this magnetic recording portion 2a may be provided at the leading margin of the row of frames arranged in series, if the portion 2a contains some data to be commonly used for the frames belonging in the same row.

Upstream of the magnetic head 17 relative to the transport direction of the film 2, there are disposed a roller 16 for feeding the film 2 to the projection exposure unit 5 and a motor M3 for driving the roller 16.

At the projection exposure unit 5, based on the image information of the film 2 read by the image sensor 15 in association with the feeding of the film 2 by means of the roller 16 and the motor M3, the controller 7 controls the light modulating filter 11 to adjust a color balance of the irradiation light beam of the projection exposure light source 10 according to color densities of the image of the film 2. Then, the film 2 is irradiated with this adjusted light beams to print the image information of the film 2 onto the print paper 3.

The loop forming unit R includes rollers 20, for transporting the print paper 3 and a motor M1 for driving the roller 20. Though not shown, between the upstream roller 20 and the downstream roller 21, there is interposed a flap device switchable between a state for linearly guiding the print paper 3 between these rollers 20, 21 and a further state for allowing formation of a loop of the print paper 3 as illustrated in FIG. 1. By this formation of the loop of the print paper 3, the transport speeds at the projection exposure unit 5 and the moving exposure unit 6 may be set independently of each other.

The moving exposure unit 6 includes an exposure light source 30, an IR (infrared) cut filter 31 for eliminating infrared beam component from the light beam emitted from the exposure light source 30, a shutter 32, and a bundle of optical fibers 35 for transmitting the light beam from the exposure light source 30 to a PLZT printing head 36. The exposure light source 30, the IR cut filter 31 and the shutter 32 are accommodated inside a single housing together with a cooling fan motor 34.

The PLZT printing head 36, though not shown, includes a number of modules containing a PLZT element between a polarizer and an analyzer, with the modules being linearly aligned in a direction normal to the transporting direction of the print paper 3. In operation of this PLZT printing head 36, by varying an electric potential applied between a pair of electrodes attached to each PLZT element, the PLZT element acts as a light shutter for selectively allowing or inhibiting passage of the light beam therethrough by varying the polarizing direction of the beam passing between the electrodes.

Hence, by independently controlling the electric potentials to be applied to the number of PLZT elements, a letter, a character or the like may be printed on the print paper 3.

On the downstream of the moving exposure unit 6 relative to the print paper 3 transporting direction, there are provided a roller 22 for transporting the print paper 3 and a motor M2 for driving the roller 22.

With cooperation of the motor M2 and the moving exposure unit 6 under the control of the controller 7, after completion of exposure of one line amount of the recording data on the print paper 3, the motor M2 drives the roller 22 to advance the print paper 3 for a distance corresponding to the one line. With repetition of these actions, the recording data as divided into a plurality of lines are exposed with shifting from one line to another onto the print paper 3.

The developing unit D, though not shown, includes a plurality of tanks charged with processing liquids for developing the exposed print paper 3. Thus, the print paper 3 is developed through its serial passage through these tanks.

Figure 3:
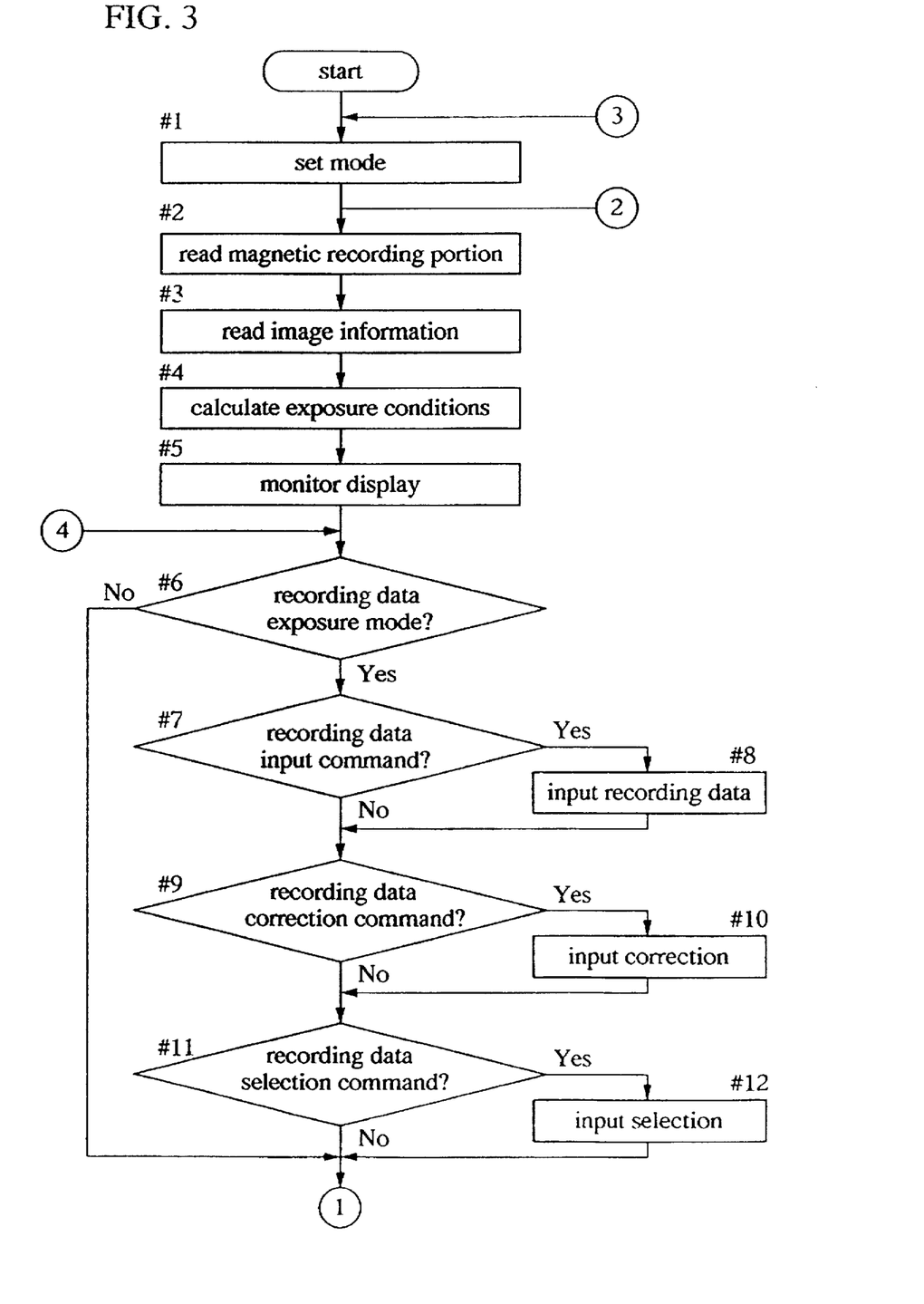
FIG. 3 is a flow chart relating to the embodiment of FIG. 1.
Figure 4:
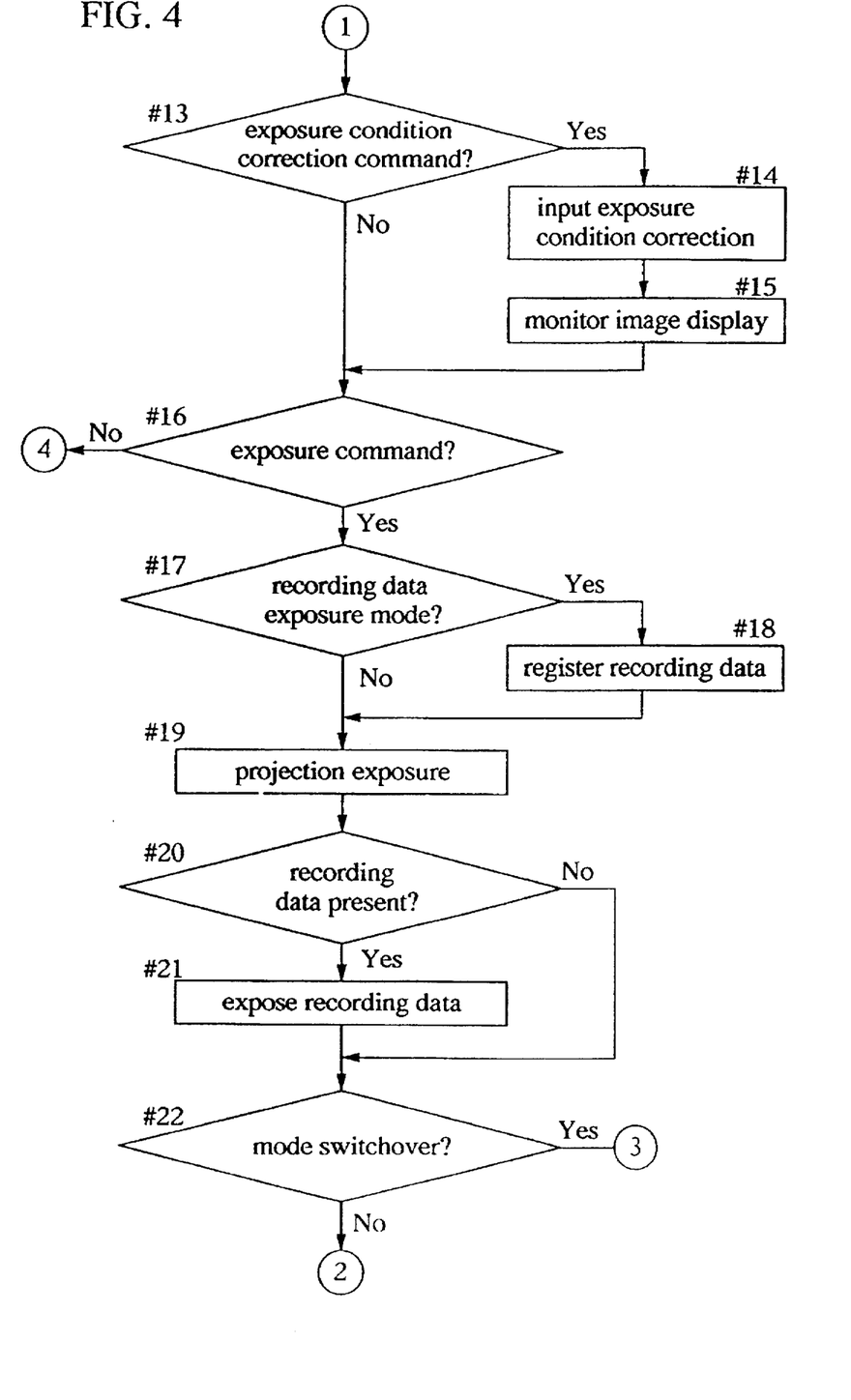
FIG. 4 is a flow chart following the flow chart of FIG. 3.

Next, an exposing operation of the print paper 3 by the image printer 1 under the control of the controller 7 will be briefly discussed with reference to a flow chart shown in FIGS. 3 and 4.

After start-up of the image printer 1, a mode setting operation is effected for either the recording data exposure mode or the recording data non-exposure mode (step #1). As the film 2 shown in FIG. 2 is charged into the projection exposure unit 5, the motor M3 is activated to transport the film 2 while the magnetic head 17 reads the recording data recorded at the magnetic recording portion 2a (step #2) and also the image sensor 15 reads the image information of the frame 2b (step #3). Then, this frame 2b whose image information has been read is transported to an exposing position.

Thereafter, based on the image information of the frame 2b of the film 2 obtained through the image sensor 15, exposure conditions for exposing a first area of the print paper 3 with the image of the frame 2b are calculated (step #4).

In the above-described calculation of the exposure conditions, the recording data recorded at the magnetic recording portion 2a of the film 2 and read by the magnetic head 17 are utilized.

More particularly, if the recording data recorded at the magnetic recording portion 2a provides such data as relating to use or non-use of backlight/under or overexposure, use or non-use of flash device used, a color temperature of the flash device used, identification of the photographic object such as 'snowy mountain', 'setting sun', 'human subject' or the like, exposure conditions may be calculated with higher precision, so that a higher-quality photographic print may be obtained.

After the calculation of the exposure conditions, an image which would result on the print paper 3 if exposed under the calculated exposure conditions is simulated and displayed on the monitor M (step #5).

At the above step, if the operation mode is set now to the recording data exposure mode, the monitor M displays not only the simulated image but also the recording data read by the reading means 17 and pertaining to the frame 2b containing the image whose simulated image is being displayed on this monitor M.

Then, after an 'exposure command' is inputted from the control panel O and until the process branches from step #16 to step #17, in the case of the recording data exposure mode, the control panel O is allowed to accept an input of recording data, input of correction data for correcting the recording data, input of selection of which of the recording data to be exposed, and an input of correction data for correcting the exposure conditions. In the case of the recording data non-exposure mode, the control panel is allowed to accept only the input of correction data for correcting the exposure conditions.

In the recording data exposure mode, if the input of recording data is commanded from the control panel O (step #7), the process accepts this input from the control panel O of the recording data to be exposed a second area of on the print paper 3 at the moving exposure unit 6 (step #8). These recording data to inputted at this step comprise the same data as those may be recorded at the magnetic recording portion 2a of the film 2 and also further data to be used solely by the image printer 1 such as the type of the print paper 3 being used.

That is to say, it is possible to input the recording data to be solely used by the image printer 1; and moreover the exposure of the print paper 3 with these recording data is possible even in the case of a film that does not have the magnetic recording portion 2a. Further, when the film 2 does have the magnetic recording portion 2a, but if there is deficiency in the recording data recorded thereat, it is possible to add the data from the control panel O. Incidentally, the inputted recording data are displayed on the monitor M at each time of the input.

In the recording data exposure mode, if an input of correction data for correcting the recording data is commanded from the control panel O (step #9), the process accepts this input of change of the recording data displayed on the monitor M from the control panel O (step #10). The changed recording data are displayed on the monitor M at each time of its input.

In the recording data exposure mode, if an input of selection of which of the recording data to be exposed is commanded from the control panel O (step #11), the process accepts this input of selection of which of the recording data to be actually exposed on the print paper 3 at the moving exposure unit 6 (step #12). The monitor M displays the recording data which can be inputted from the control panel O and displays also the exposure conditions obtained in the above-described manner to be used for the exposure of the image of the film 2, so that these exposure conditions too can be selected as the recording data to be exposed on the print paper 3. Incidentally, the selected items of the recording data are displayed in a color different from that of the remaining, non-selected items of the same. Further, if there is no input for this selection of the recording data to be exposed, the previously selected inputted data are maintained as effective.

If an input of correction of the exposure conditions is commanded from the control panel O (step #13), the process accepts this input of correction of exposure conditions from the control panel O (step #14). Then, an image which would result if exposed under these corrected exposure conditions is simulated and displayed on the monitor M (step #15).

If an exposure operation is commanded from the control panel O, the process branches from step #16 to step #17. Then, in the case of the recording data exposure mode, at this timing, the selected recording data are registered or stored as the recording data to be exposed on the print paper 3 (step #18). Incidentally, there exists a distance corresponding to a plurality of frames until the print paper 3 is transported to the exposing position of the moving exposure unit 6 after the exposure at the projection exposure unit 5. Therefore, the recording data registered at step #18 are maintained until the portion of the print paper 3 exposed with the image of the film 2 corresponding to said data arrives at the exposing position of the moving exposure unit 6. That is to say, the registered recording data to be exposed at the moving exposure unit 6 exist for a plurality of frames, i.e. plural of film images, and these data are exposed at the moving exposure unit 6 in a serial manner according to the chronological order of their input/registration.

After completion of the registration of the recording data at step #18, the light modulating filter 11 and the shutter 14 of the projection exposure section 5 are controlled under the obtained exposed conditions to expose the image of the film 2 onto the print paper 3 (step #19).

Figure 5:
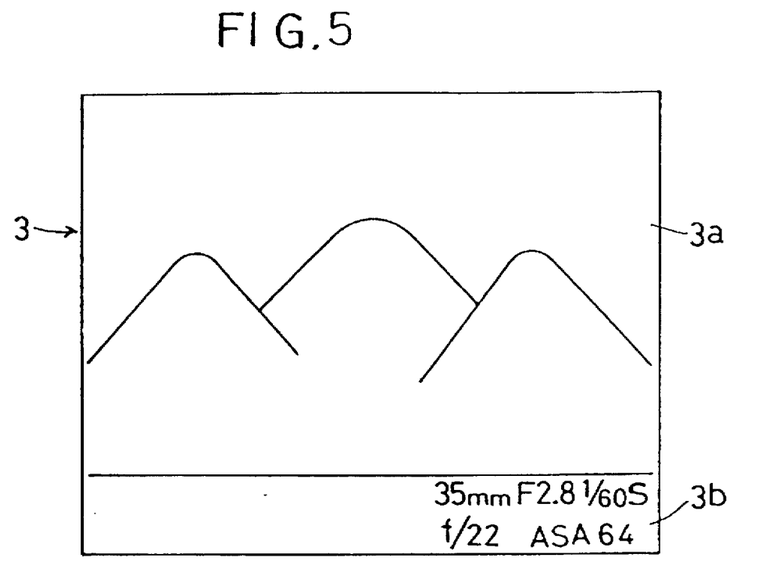
FIG. 5 is a view illustrating a sample exposure of recording data relating to the embodiment of FIG. 1.

Next, the process judges whether or not the portion of the print paper 3 exposed with the image of the frame 2b corresponding to the oldest set of the registered recording data has arrived at the position of the PLZT printing head 36, i.e. the exposing position of the moving exposure unit 6 (step #20). If the process determines that the image of the frame 2b corresponding to the oldest set of registered data has arrived at said position; then, these registered data are exposed at a data recording area 3b provided downwardly of the image-recording portion 3a of the print paper 3, as illustrated in FIG. 5 (step #21). FIG. 5 illustrates this as after its development at the developing unit D. Both the first area 3a and the second area 3b are on the same side of the print paper 3, and area 3b is distinct from area 3a.

After completion of the exposure of the recording data, if a switchover between the recording data exposure mode and the recording data non-exposure mode is commanded from the control panel O (step #22), then, the process returns to step #1 to accept this operation mode switchover command. Otherwise, the process returns to step #2 to initiate reading of image information of the next film frame 2b.

Accordingly, the projection exposure unit 5 and the controller 7 together act as image exposure means IE for exposing an image of the film 2 on the print paper 3. The moving exposure unit 6 and the controller 7 together act as recording data exposure means ME for exposing recording data on the print paper 3. The control panel O acts as manual input means MI for manually inputting the recording data to be exposed on the print paper 3, mode instructing means MC for selectively instructing a recording data exposure mode or a recording data non-exposure mode, and also as correction input means CI for correcting the recording data. The magnetic head 17, the control panel O and the controller 7 together act as recording data input means I for inputting recording data to be exposed on the print paper 3 in accordance with the image of the film 2.

The monitor M acts as monitor means M for displaying the recording data inputted by the recording data input means I.

Next, other embodiments of the present invention will be specifically described.

(1) In the foregoing embodiment, the image exposure means IE for exposing the print paper 3 with an image of the frame 2b of the film 2 and the recording data exposure means ME for exposing the print paper 3 with various recording data are provided separately from each other. Instead, these may be constructed as a single component.

Figure 6:
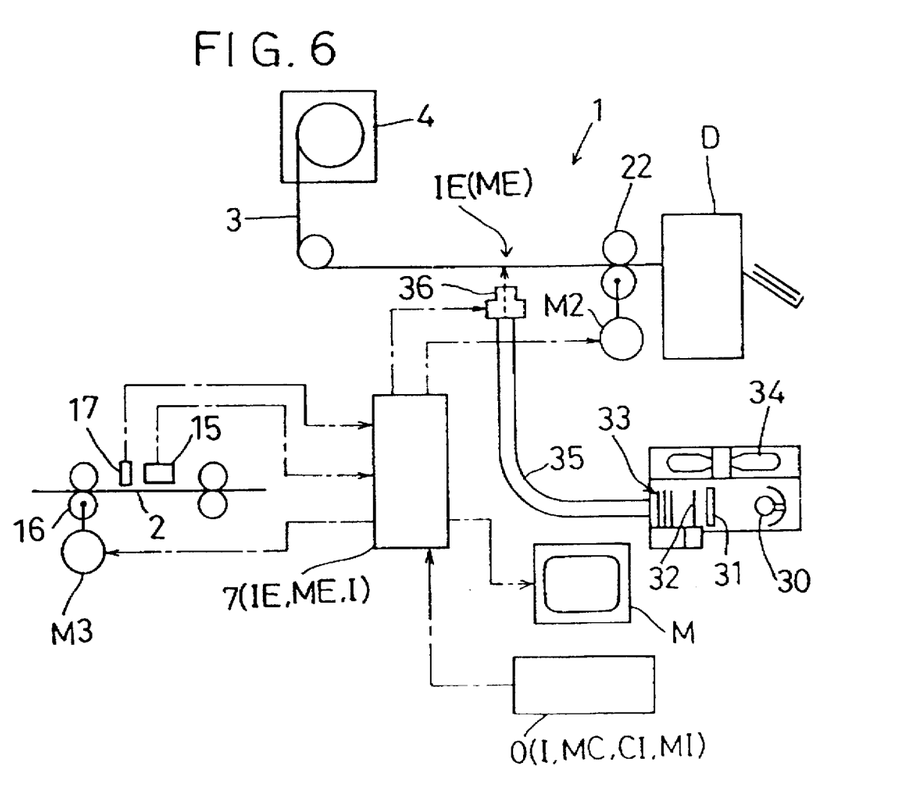
FIG. 6 is a schematic construction view of an image printer relating to a further embodiment of the invention.

Specifically, as shown in FIG. 6, the image exposure means IE includes an optical fiber bundle 35 for guiding the exposing light beam to the PLZT printing head 36 and the light modulating filter 33 consisting essentially of Y (yellow), M (magenta) and C (cyan) filters, so as to effect a color exposure of the print paper 3 through control of the light modulating filter 33. The controller 7, which forms a part of the image exposure means IE, determines an exposure amount for each of number of areas of the image based on the image information of the film 2 read by the image sensor 15 as image information reading means and controls the PLZT printing head 36, the light modulating filter 33, the shutter 32 and so on to expose the image of the frame 2b of the film 2 on the print paper 3 under the determined exposure conditions. In addition, the controller 7 produces exposure data to be used for the exposure of the various kinds of recording data as described in the foregoing embodiment and controls the same components of the image exposure means IE, i.e. the PLZT printing head 36, the light modulating filter 33, the shutter 32 and so on, to expose these recording data on the print paper 3. In this manner, the image exposure means IE is caused to act also as the recording data exposure means ME in the instant embodiment.

(2) In the foregoing embodiment, the moving exposure unit 6 employs the PLZT printing head 36. Instead, various other types of constructions are conceivable for this unit 6, such as one in which an image of a CRT device is exposed on the print paper 3 or another in which the exposure of the print paper 3 is effected by means of a dot-matrix type LED device.

(3) In the foregoing embodiment, the determination of the exposure conditions to be used for the exposure of the image of the film 2 on the print paper 3 at the projection exposure unit 5 is effected based both on the data read by the image sensor 15 and on the recording data read by the magnetic head 17 from the magnetic recording portion 2a of the film 2. Instead, the determination may be made based solely on the data read by the image sensor 15. Conversely, the determination may be made based solely on the data read by the magnetic head 17 from the magnetic recording portion 2a of the film 2.

(4) In the foregoing embodiment, the moving exposure unit 6 is adapted to expose the various recording data to the data recording portion 3b provided downwardly of the image-recording portion 3a of the print paper 3. Instead, if desired, the recording data may be exposed in an overlapped state within the image-exposed portion of the film.

(5) In the foregoing embodiment, the print paper 3 is used as an example of the photosensitive material. Instead, a photosensitive drum of a copier may be used as the photosensitive material to be exposed with the image and various recording data of the film 2.

(6) In the foregoing embodiment, the controller 7 directly controls the operations of the projection exposure unit 5 and the moving exposure unit 6. This controller 7 may include two independent control modules for controlling the projection exposure unit 5 and the moving exposure unit 6 independently of each other.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. An image printer comprising
    image exposure means for exposing a first area of a photosensitive material with an image of a film;
    recording data input means including reading means for reading recording data which are recorded in a magnetic recording portion of the film, said recording data input means inputting the recording data to be exposed on the photosensitive material in accordance with the image;
    recording data exposure means for exposing the photosensitive materials with said recording data inputted from said recording data input means at a second area of said photosensitive material which is distinct from said first area;
    monitor means for displaying the recording data inputted from said recording data input means; and
    correction input means for correcting the recording data to be exposed by said recording data exposure means.

2. An image printer as defined in claim 1, wherein said recording data input means includes manual input means for allowing manual input of the recording data to be exposed on the photosensitive material.

3. An image printer as defined in claim 1, wherein said reading means is a magnetic head.

4. An image printer as defined in claim 1, wherein said recording data input means includes manual input means for allowing manual input of the recording data to be exposed on the photosensitive material.

5. An image printer as defined in claim 4, further comprising mode instructing means for selectively instructing a recording data exposure mode or a recording data non-exposure mode, so that said recording data exposure means effects exposure of the recording data only when said mode instructing means instructs the recording data exposure mode.

6. An image printer as defined in claim 5, wherein said image exposure means obtains exposure conditions based on the recording data inputted from said recording data input means.

7. An image printer as defined in claim 1, further comprising image information reading means for reading the image information of the film in the form of a plurality of discrete areas, wherein said image exposure means determines an exposure amount for each of the discrete areas based on the recording data read by said image data reading means and then exposes the photosensitive material with thus determined exposure amounts; and wherein said image exposure means acts also as said recording data exposure means for exposing the photosensitive material with the recording data inputted from said recording data input means.

8. An image printer as defined in claim 7, wherein said image reading means is an image sensor operable to irradiate a white light beam onto the film and to separate its reflection or transmission light beam into three primary color components of red, green and blue and then to measure intensities of the respective components.

9. An image printer as defined in claim 1, further comprising mode instructing means for selectively instructing a recording data exposure mode or a recording data non-exposure mode, so that said recording data exposure means effects exposure of the recording data only when said mode instructing means instructs the recording data exposure mode.

10. An image printer as defined in claim 1, wherein said image exposure means obtains exposure conditions based on the recording data inputted from said recording data input means.

11. An image printer as defined in claim 1, further comprising image information reading means for reading the image information of the film in the form of a plurality of discrete areas, wherein said image exposure means determines an exposure amount for each of the discrete areas based on the recording data read by said image data reading means and then exposes the photosensitive material with thus determined exposure amounts; and wherein said image exposure means acts also as said recording data exposure means for exposing the photosensitive material with the recording data inputted from said recording data input means.

12. An image printer as defined in claim 11, wherein said image reading means is an image sensor operable to irradiate a white light beam onto the film and to separate its reflection or transmission light beam into three primary color components of red, green and blue and then to measure intensities of the respective components.

13. An image printer as defined in claim 1, further comprising a loop forming unit for forming a loop of the photosensitive material so to effect transportations of the photosensitive material at said image exposure means and said recording data exposure means independently of each other.

14. An image printer as defined in claim 1, wherein said image exposure means and said recording data exposure means are constructed as a single integral unit.

15. An image printer as defined in claim 1, wherein display contents of said monitor means are changed in accordance with correction of the recording data.

16. An image printer as defined in claim 1, wherein said correction input means is capable of receiving an instruction as to which item of the recording information displayed on said monitor means is to be exposed on the photosensitive material.

17. An image printer as defined in claim 16, wherein said monitor means displays the item of the recording information on which the instruction for exposure has been given in a different color than the other items of the recording information.

18. An image printer as in claim 1 wherein said photosensitive material is a photographic print paper, said first and second areas being on the same side of the paper.

19. An image printer as in claim 1 wherein said recording data includes aspect ratio and exposure time.

* * * * *